(12) United States Patent
Russell

(10) Patent No.: US 6,605,948 B2
(45) Date of Patent: Aug. 12, 2003

(54) TEST SYSTEM FOR A GAS TURBINE ENGINE CONTROL PROGRAMMING PLUG

(75) Inventor: Paul D. Russell, Broadbrook, CT (US)

(73) Assignee: United Technologies Corporation, Hartford, CT (US)

( * ) Notice: Subject to any disclaimer, the term of this patent is extended or adjusted under 35 U.S.C. 154(b) by 69 days.

(21) Appl. No.: 09/917,470

(22) Filed: Jul. 27, 2001

(65) Prior Publication Data

US 2003/0076114 A1 Apr. 24, 2003

(51) Int. Cl.[7] .................. H01H 31/04; G01R 31/00; H01R 29/00
(52) U.S. Cl. .................. 324/538; 324/500; 439/188
(58) Field of Search .................. 324/538, 503, 324/555, 519, 158.1, 539, 500, 754; 439/189, 188; 326/39

(56) References Cited

U.S. PATENT DOCUMENTS 4,734,651 A * 3/1988 Keller et al. ............... 324/519
5,097,213 A * 3/1992 Hunting et al. ............ 324/519

* cited by examiner

Primary Examiner—N. Le
Assistant Examiner—James Kerveros
(74) Attorney, Agent, or Firm—Kenneth C. Baran

(57) ABSTRACT

A test system for testing the wiring configuration of a programming plug 10 for a gas turbine engine control unit 16 includes an array of multiplexers 28. The multiplexers concurrently acquiring one data bit from a prescribed data pin in each of several groups of data pins projecting from the plug. A computer operating under the authority of an executable computer program produces an incrementable selection signal to successively prescribe the individual data pins from which data is to be acquired. The system also includes standards against which the condition or validity of the wiring configuration is assessed. A display system, such as a video monitor reports the condition of the programming plug.

12 Claims, 16 Drawing Sheets

FIG.3

PARALLEL PORT SIGNALS, ARRANGED BY PIN NUMBER

| Pin: D-sub | Signal | Function | Source | Register Name | Bit # | Invert at connector? |
|---|---|---|---|---|---|---|
| 1 | nStrobe | strobe D0-D7 | PC | Control | 0 | Y |
| 2 | D0 | Data Bit 0 | PC | Data | 0 | N |
| 3 | D1 | Data Bit 1 | PC | Data | 1 | N |
| 4 | D2 | Data Bit 2 | PC | Data | 2 | N |
| 5 | D3 | Data Bit 3 | PC | Data | 3 | N |
| 6 | D4 | Data Bit 4 | PC | Data | 4 | N |
| 7 | D5 | Data Bit 5 | PC | Data | 5 | N |
| 8 | D6 | Data Bit 6 | PC | Data | 6 | N |
| 9 | D7 | Data Bit 7 | PC | Data | 7 | N |
| 10 | nACK | Acknowledge | Printer | Status | 6 | N |
| 11 | Busy | Printer Busy | Printer | Status | 7 | Y |
| 12 | PaperEnd | Out of paper | Printer | Status | 5 | N |
| 13 | Select | Printer on line | Printer | Status | 4 | N |
| 14 | nAutoLF | Auto Line feed | PC | Control | 1 | Y |
| 15 | nError | Error | Printer | Status | 3 | N |
| 16 | nInit | Reset Printer | PC | Control | 2 | N |
| 17 | nSelectIn | Select Printer on line | PC | Control | 3 | Y |
| 18 | Gnd | Ground for D0 | | | | |
| 19 | Gnd | Ground for D1, D2 | | | | |
| 20 | Gnd | Ground for D3, D4 | | | | |
| 21 | Gnd | Ground for D5, D6 | | | | |
| 22 | Gnd | Ground for D7, nAck | | | | |
| 23 | Gnd | Ground for nSelectIn | | | | |
| 24 | Gnd | Ground for Busy | | | | |
| 25 | Gnd | Ground for nInit | | | | |
| | | | | | | |
| | | | | | | |

Figure A-1: EPPTest Visual Basic Code

Option Explicit
Dim DataIn%(0 To 7)
Dim DataByte%(0 To 2)

Private Sub cmdReadBytes_Click()
Dim BitNumber%
'The control port selects a bit number to read.
'The status port holds the data to be read.
For BitNumber = 0 To 7
   ControlPortWrite BaseAddress, BitNumber
   DataIn(BitNumber) = StatusPortRead(BaseAddress)
Next BitNumber
GetBytesFromDataIn
DisplayResults
End Sub

Private Sub GetBytesFromDataIn()
'Bits 3-5 of the 8 bytes contain data.
'To make 3 data bytes from these bits,
'each data byte contains one bit from each byte read.
'For example, data byte 0 contains 8 "bit 3s," one from each byte read.
Dim ByteNumber%
Dim BitNumber%
Dim BitToAdd%
For ByteNumber = 0 To 2
   DataByte(ByteNumber) = 0
   'BitRead gets the selected bit value (ByteNumber + 3)
   'from the selected byte read (DataIn(BitNumber)).
   'To get the bit value for the created data byte, multiply times 2^BitNumber.
   'Add each bit value to the created byte.
   For BitNumber = 0 To 7
      BitToAdd = (BitRead(DataIn(BitNumber), ByteNumber + 3)) * 2 ^ BitNumber
      DataByte(ByteNumber) = DataByte(ByteNumber) + BitToAdd
   Next BitNumber
Next ByteNumber
End Sub

Private Sub DisplayResults()
Dim ByteNumber%
For ByteNumber = 0 To 2
lblByteIn(ByteNumber).Caption = Hex$(DataByte(ByteNumber)) & "h"
Next ByteNumber
DisplayPartNumber
End Sub

```
Private Sub DisplayPartNumber()
If lblByteIn(0) <> lblByteIn(1) Then
    txtPartnumber.Text = "Invalid P/N"
    txtRating(1).Text = ""
    txtEPPclass(1).Text = ""
    Beep
Else
If lblByteIn(0) = "0h" Then
    txtPartnumber.Text = "Plug Not Installed"
    txtRating(1).Text = ""
    txtEPPclass(1).Text = ""
    Beep
    Exit Sub
End If
End If
  Select Case lblByteIn(0)
    Case "40h"
        txtPartnumber.Text = "51D400"
        txtRating(1).Text = "Invalid Rating"
    Case "01h"
        txtPartnumber.Text = "51D401"
        txtRating(1).Text = "Invalid Rating"
    Case "02h"
        txtPartnumber.Text = "51D402"
        txtRating(1).Text = "Invalid Rating"
    Case "43h"
        txtPartnumber.Text = "51D403"
        txtRating(1).Text = "Invalid Rating"
    Case "04h"
        txtPartnumber.Text = "51D404"
        txtRating(1).Text = "Invalid Rating"
    Case "45h"
        txtPartnumber.Text = "51D405"
        txtRating(1).Text = "Invalid Rating"
    Case "46h"
        txtPartnumber.Text = "51D406"
        txtRating(1).Text = "Invalid Rating"
    Case "07h"
        txtPartnumber.Text = "51D407"
        txtRating(1).Text = "Invalid Rating"
    Case "08h"
        txtPartnumber.Text = "51D408"
        txtRating(1).Text = "Invalid Rating"
    Case "49h"
        txtPartnumber.Text = "51D409"
        txtRating(1).Text = "Invalid Rating"
    Case "4Ah"
        txtPartnumber.Text = "51D410"
        txtRating(1).Text = "PW4152"
    Case "0Bh"
        txtPartnumber.Text = "51D411"
        txtRating(1).Text = "PW4152"
    Case "4ch"
```

```
        txtPartnumber.Text = "51D412"
        txtRating(1).Text = "PW4152"
Case "0Dh"
        txtPartnumber.Text = "51D413"
        txtRating(1).Text = "PW4152"
Case "0eh"
        txtPartnumber.Text = "51D414"
        txtRating(1).Text = "PW4156A"
Case "4Fh"
        txtPartnumber.Text = "51D415"
        txtRating(1).Text = "PW4156A"
Case "10h"
        txtPartnumber.Text = "51D416"
        txtRating(1).Text = "PW4158"
Case "51h"
        txtPartnumber.Text = "51D417"
        txtRating(1).Text = "PW4158"
Case "52h"
        txtPartnumber.Text = "51D418"
        txtRating(1).Text = "Invalid Rating"
Case "13h"
        txtPartnumber.Text = "51D419"
        txtRating(1).Text = "Invalid Rating"
Case "54h"
        txtPartnumber.Text = "51D420"
        txtRating(1).Text = "Invalid Rating"
Case "15h"
        txtPartnumber.Text = "51D421"
        txtRating(1).Text = "Invalid Rating"
Case "16h"
        txtPartnumber.Text = "51D422"
        txtRating(1).Text = "Invalid Rating"
Case "57h"
        txtPartnumber.Text = "51D423"
        txtRating(1).Text = "Invalid Rating"
Case "58h"
        txtPartnumber.Text = "51D424"
        txtRating(1).Text = "Invalid Rating"
Case "19h"
        txtPartnumber.Text = "51D425"
        txtRating(1).Text = "Invalid Rating"
Case "1Ah"
        txtPartnumber.Text = "51D426"
        txtRating(1).Text = "PW4156"
Case "5Bh"
        txtPartnumber.Text = "51D427"
        txtRating(1).Text = "PW4156"
Case "1Ch"
        txtPartnumber.Text = "51D428"
        txtRating(1).Text = "Invalid Rating"
Case "5Dh"
        txtPartnumber.Text = "51D429"
        txtRating(1).Text = "Invalid Rating"
Case "5Eh"
        txtPartnumber.Text = "51D430"
        txtRating(1).Text = "Invalid Rating"
Case "1Fh"
```

```
        txtPartnumber.Text = "51D431"
        txtRating(1).Text = "Invalid Rating"
    Case "20h"
        txtPartnumber.Text = "51D432"
        txtRating(1).Text = "Invalid Rating"
    Case "61h"
        txtPartnumber.Text = "51D433"
        txtRating(1).Text = "Invalid Rating"
    Case "62h"
        txtPartnumber.Text = "51D434"
        txtRating(1).Text = "PW4158"
    Case "23h"
        txtPartnumber.Text = "51D435"
        txtRating(1).Text = "PW4158"
    Case "64h"
        txtPartnumber.Text = "51D436"
        txtRating(1).Text = "Invalid Rating"
    Case "25"
        txtPartnumber.Text = "51D437"
        txtRating(1).Text = "Invalid Rating"
    Case "26h"
        txtPartnumber.Text = "51D438"
        txtRating(1).Text = "Invalid Rating"
    Case "67h"
        txtPartnumber.Text = "51D439"
        txtRating(1).Text = "Invalid Rating"
    Case "68h"
        txtPartnumber.Text = "51D440"
        txtRating(1).Text = "PW4158"
    Case "29h"
        txtPartnumber.Text = "51D441"
        txtRating(1).Text = "PW4158"
    Case "2Ah"
        txtPartnumber.Text = "51D442"
        txtRating(1).Text = "PW4158"
    Case "6Bh"
        txtPartnumber.Text = "51D443"
        txtRating(1).Text = "PW4158"
    Case "2Ch"
        txtPartnumber.Text = "51D444"
        txtRating(1).Text = "PW4158"
    Case "6Dh"
        txtPartnumber.Text = "51D445"
       txtRating(1).Text = "PW4158"
    Case "6Eh"
        txtPartnumber.Text = "51D446"
        txtRating(1).Text = "PW4156A"
    Case "2Fh"
        txtPartnumber.Text = "51D447"
        txtRating(1).Text = "PW4156A"
    Case "70h"
        txtPartnumber.Text = "51D448"
        txtRating(1).Text = "PW4156A"
    Case "31h"
        txtPartnumber.Text = "51D449"
        txtRating(1).Text = "PW4156A"
    Case "32h"
```

```
            txtPartnumber.Text = "51D450"
            txtRating(1).Text = "PW4156A"
         Case "73h"
            txtPartnumber.Text = "51D451"
            txtRating(1).Text = "PW4156A"
         Case "34h"
            txtPartnumber.Text = "51D452"
            txtRating(1).Text = "PW4156A"
         Case "75h"
            txtPartnumber.Text = "51D453"
            txtRating(1).Text = "PW4156A"
         Case "76h"
            txtPartnumber.Text = "51D454"
            txtRating(1).Text = "PW4152"
         Case "37h"
            txtPartnumber.Text = "51D455"
            txtRating(1).Text = "PW4152"
         Case "38h"
            txtPartnumber.Text = "51D456"
            txtRating(1).Text = "PW4152"
         Case "79h"
            txtPartnumber.Text = "51D457"
            txtRating(1).Text = "PW4152"
         Case "7Ah"
            txtPartnumber.Text = "51D458"
            txtRating(1).Text = "PW4152"
         Case "3Bh"
            txtPartnumber.Text = "51D459"
            txtRating(1).Text = "PW4152"
         Case "7Ch"
            txtPartnumber.Text = "51D460"
            txtRating(1).Text = "PW4156A"
         Case "3dh"
            txtPartnumber.Text = "51D461"
            txtRating(1).Text = "PW4156A"
         Case "3Eh"
            txtPartnumber.Text = "51D462"
            txtRating(1).Text = "PW4156A"
         Case Else
            txtPartnumber.Text = "Invalid P/N"
            txtRating(1).Text = "Invalid Rating"
      End Select
      DisplayEPPClass
   End Sub Private Sub DisplayEPPClass()
      Select Case lblByteIn(2)
         Case "0h"
            txtEPPclass(1).Text = "Invalid Class"
         Case "03h"
            txtEPPclass(1).Text = "01 / +00.032"
         Case "04h"
            txtEPPclass(1).Text = "02 / +00.028"
         Case "08h"
            txtEPPclass(1).Text = "03 / +00.024"
         Case "0Fh"
            txtEPPclass(1).Text = "04 / +00.020"
```

```
            Case "10h"
              txtEPPclass(1).Text = "05 / +00.016"
            Case "17h"
              txtEPPclass(1).Text = "06 / +00.012"
            Case "1Bh"
              txtEPPclass(1).Text = "07 / +00.008"
            Case "1Ch"
              txtEPPclass(1).Text = "08 / +00.004"
            Case "20h"
              txtEPPclass(1).Text = "09 / +00.000"
            Case "27h"
              txtEPPclass(1).Text = "10 / -00.004"
            Case "2Bh"
              txtEPPclass(1).Text = "11 / -00.008"
            Case "2Ch"
              txtEPPclass(1).Text = "12 / -00.012"
            Case "33h"
              txtEPPclass(1).Text = "13 / -00.016"
            Case "34h"
              txtEPPclass(1).Text = "14 / -00.020"
            Case "38h"
              txtEPPclass(1).Text = "15 / -00.024"
            Case "3Fh"
              txtEPPclass(1).Text = "16 / -00.028"
            Case Else
              txtEPPclass(1).Text = "Invalid Class"
        End Select End Sub Private Sub Form_Load()
StartUp
End Sub Private Sub Form_Unload(Cancel%)
ShutDown End Sub
```

ENGINE PROGRAMMING PLUG PART NUMBER & RATING MATRIX

| Ch. A Pins | G | F | E | D | C | B | A | |
|---|---|---|---|---|---|---|---|---|
| Ch. B Pins | R | P | N | M | L | K | J | |
| | | | | | | | | |
| | | | | | | | | |
| Bit Weight (Hex) | 40 | 20 | 10 | 8 | 4 | 2 | 1 | |
| | | | | | | | | |
| EPP P/N | | | | | | | | Engine Rating |
| 51D400 | 1 | 0 | 0 | 0 | 0 | 0 | 0 | Invalid Rating |
| 51D401 | 0 | 0 | 0 | 0 | 0 | 0 | 1 | Invalid Rating |
| 51D402 | 0 | 0 | 0 | 0 | 0 | 1 | 0 | Invalid Rating |
| 51D403 | 1 | 0 | 0 | 0 | 0 | 1 | 1 | Invalid Rating |
| 51D404 | 0 | 0 | 0 | 0 | 1 | 0 | 0 | Invalid Rating |
| 51D405 | 1 | 0 | 0 | 0 | 1 | 0 | 1 | Invalid Rating |
| 51D406 | 1 | 0 | 0 | 0 | 1 | 1 | 0 | Invalid Rating |
| 51D407 | 0 | 0 | 0 | 0 | 1 | 1 | 1 | Invalid Rating |
| 51D408 | 0 | 0 | 0 | 1 | 0 | 0 | 0 | Invalid Rating |
| 51D409 | 1 | 0 | 0 | 1 | 0 | 0 | 1 | Invalid |

|  |  |  |  |  |  |  |  | Rating |
|---|---|---|---|---|---|---|---|---|
| 51D410 | 1 | 0 | 0 | 1 | 0 | 1 | 0 | PW4152 |
| 51D411 | 0 | 0 | 0 | 1 | 0 | 1 | 1 | PW4152 |
| 51D412 | 0 | 0 | 0 | 1 | 1 | 0 | 0 | PW4152 |
| 51D413 | 0 | 0 | 0 | 1 | 1 | 0 | 1 | PW4152 |
| 51D414 | 0 | 0 | 0 | 1 | 1 | 1 | 0 | PW4156A |
| 51D415 | 1 | 0 | 0 | 1 | 1 | 1 | 1 | PW4156A |
| 51D416 | 0 | 0 | 1 | 0 | 0 | 0 | 0 | PW4158 |
| 51D417 | 1 | 0 | 1 | 0 | 0 | 0 | 1 | PW4158 |
| 51D418 | 1 | 0 | 1 | 0 | 0 | 1 | 0 | Invalid Rating |
| 51D419 | 0 | 0 | 1 | 0 | 0 | 1 | 1 | Invalid Rating |
| 51D420 | 1 | 0 | 1 | 0 | 1 | 0 | 0 | Invalid Rating |
| 51D421 | 0 | 0 | 1 | 0 | 1 | 0 | 1 | Invalid Rating |
| 51D422 | 0 | 0 | 1 | 0 | 1 | 1 | 0 | Invalid Rating |
| 51D423 | 1 | 0 | 1 | 0 | 1 | 1 | 1 | Invalid Rating |
| 51D424 | 1 | 0 | 1 | 1 | 0 | 0 | 0 | Invalid Rating |
| 51D425 | 0 | 0 | 1 | 1 | 0 | 0 | 1 | Invalid Rating |
| 51D426 | 0 | 0 | 1 | 1 | 0 | 1 | 0 | PW4156 |
| 51D427 | 1 | 0 | 1 | 1 | 0 | 1 | 1 | PW4156 |
| 51D428 | 0 | 0 | 1 | 1 | 1 | 0 | 0 | Invalid Rating |
| 51D429 | 1 | 0 | 1 | 1 | 1 | 0 | 1 | Invalid |

|  |  |  |  |  |  |  |  | Rating |
|---|---|---|---|---|---|---|---|---|
| 51D430 | 1 | 0 | 1 | 1 | 1 | 1 | 0 | Invalid Rating |
| 51D431 | 0 | 0 | 1 | 1 | 1 | 1 | 1 | Invalid Rating |
| 51D432 | 0 | 1 | 0 | 0 | 0 | 0 | 0 | Invalid Rating |
| 51D433 | 1 | 1 | 0 | 0 | 0 | 0 | 1 | Invalid Rating |
| 51D434 | 1 | 1 | 0 | 0 | 0 | 1 | 0 | PW4158 |
| 51D435 | 0 | 1 | 0 | 0 | 0 | 1 | 1 | PW4158 |
| 51D436 | 1 | 1 | 0 | 0 | 1 | 0 | 0 | Invalid Rating |
| 51D437 | 0 | 1 | 0 | 0 | 1 | 0 | 1 | Invalid Rating |
| 51D438 | 0 | 1 | 0 | 0 | 1 | 1 | 0 | Invalid Rating |
| 51D439 | 1 | 1 | 0 | 0 | 1 | 1 | 1 | Invalid Rating |
| 51D440 | 1 | 1 | 0 | 1 | 0 | 0 | 0 | PW4158 |
| 51D441 | 0 | 1 | 0 | 1 | 0 | 0 | 1 | PW4158 |
| 51D442 | 0 | 1 | 0 | 1 | 0 | 1 | 0 | PW4158 |
| 51D443 | 1 | 1 | 0 | 1 | 0 | 1 | 1 | PW4158 |
| 51D444 | 0 | 1 | 0 | 1 | 1 | 0 | 0 | PW4158 |
| 51D445 | 1 | 1 | 0 | 1 | 1 | 0 | 1 | PW4158 |
| 51D446 | 1 | 1 | 0 | 1 | 1 | 1 | 0 | PW4156A |
| 51D447 | 0 | 1 | 0 | 1 | 1 | 1 | 1 | PW4156A |
| 51D448 | 1 | 1 | 1 | 0 | 0 | 0 | 0 | PW4156A |
| 51D449 | 0 | 1 | 1 | 0 | 0 | 0 | 1 | PW4156A |
| 51D450 | 0 | 1 | 1 | 0 | 0 | 1 | 0 | PW4156A |

| | | | | | | | | |
|---|---|---|---|---|---|---|---|---|
| 51D451 | 1 | 1 | 1 | 0 | 0 | 1 | 1 | PW4156A |
| 51D452 | 0 | 1 | 1 | 0 | 1 | 0 | 0 | PW4156A |
| 51D453 | 1 | 1 | 1 | 0 | 1 | 0 | 1 | PW4156A |
| 51D454 | 1 | 1 | 1 | 0 | 1 | 1 | 0 | PW4152 |
| 51D455 | 0 | 1 | 1 | 0 | 1 | 1 | 1 | PW4152 |
| 51D456 | 0 | 1 | 1 | 1 | 0 | 0 | 0 | PW4152 |
| 51D457 | 1 | 1 | 1 | 1 | 0 | 0 | 1 | PW4152 |
| 51D458 | 1 | 1 | 1 | 1 | 0 | 1 | 0 | PW4152 |
| 51D459 | 0 | 1 | 1 | 1 | 0 | 1 | 1 | PW4152 |
| 51D460 | 1 | 1 | 1 | 1 | 1 | 0 | 0 | Invalid Rating |
| 51D461 | 0 | 1 | 1 | 1 | 1 | 0 | 1 | Invalid Rating |
| 51D462 | 0 | 1 | 1 | 1 | 1 | 1 | 0 | Invalid Rating |

FIG.10

ENGINE PROGRAMMING PLUG EPP CLASS/ DELTA EPR MATRIX

| Ch. A Pins | | Z | V | C | b | | H |
|---|---|---|---|---|---|---|---|
| Ch. B Pins | | | | | | S | |
| | | | | | | | |
| Bit Weight (Hex) | | 20 | 10 | 8 | 4 | 2 | 1 |
| | | | | | | | |
| EPP Class | Delta EPR | | | | | | |
| 1 | +00.032 | 0 | 0 | 0 | 0 | 1 | 1 |
| 2 | +00.028 | 0 | 0 | 0 | 1 | 0 | 0 |
| 3 | +00.024 | 0 | 0 | 1 | 0 | 0 | 0 |
| 4 | +00.020 | 0 | 0 | 1 | 1 | 1 | 1 |
| 5 | +00.016 | 0 | 1 | 0 | 0 | 0 | 0 |
| 6 | +00.012 | 0 | 1 | 0 | 1 | 1 | 1 |
| 7 | +00.008 | 0 | 1 | 1 | 0 | 1 | 1 |
| 8 | +00.004 | 0 | 1 | 1 | 1 | 0 | 0 |
| 9 | 0.000 | 1 | 0 | 0 | 0 | 0 | 0 |
| 10 | -00.004 | 1 | 0 | 0 | 1 | 1 | 1 |
| 11 | -00.008 | 1 | 0 | 1 | 0 | 1 | 1 |
| 12 | -00.012 | 1 | 0 | 1 | 1 | 0 | 0 |
| 13 | -00.016 | 1 | 1 | 0 | 0 | 1 | 1 |
| 14 | -00.020 | 1 | 1 | 0 | 1 | 0 | 0 |
| 15 | -00.024 | 1 | 1 | 1 | 0 | 0 | 0 |
| 16 | -00.031 | 1 | 1 | 1 | 1 | 1 | 1 |

TEST SYSTEM FOR A GAS TURBINE ENGINE CONTROL PROGRAMMING PLUG

TECHNICAL FIELD

This invention relates to programming plugs used to customize the control systems of modern gas turbine engines, and particularly to a test system for testing the wiring configuration of the programming plug.

BACKGROUND OF THE INVENTION

Modern gas turbine engines, such as those used to power commercial aircraft, operate under the direction of a full authority digital electronic control system (FADEC). The FADEC includes numerous control schedules. These control schedules include power setting schedules that govern steady state engine power, and other schedules that control engine transient response and regulate a number of variable geometry features, such as the pitch angle of variable pitch stator vanes. In operation, the FADEC receives command signals, feedback signals and environmental signals. An example of a command signal is a signal representing the throttle position set by the aircraft pilot. Examples of feedback signals include signals representing engine parameters (e.g. rotational speeds, internal pressures, and internal temperatures). Examples of environmental signals include signals indicating environmental conditions (e.g. ambient pressures and temperatures). The FADEC processes these signals, as prescribed by the various control schedules, to produce a series of electrical output signals. The output signals drive fuel valves and various actuators to regulate engine thrust and ensure peak engine performance and operability.

Engine manufacturers frequently offer distinct "families" of engines, each of which comprises several closely related engine "models". Each engine model, when equipped with its FADEC, satisfies the requirements of a particular aircraft or of a mission profile specified by the aircraft owner. For example, the assignee of the present application offers several models of its PW-4000 engine family, among them the PW-4156, which produces 56,000 pounds of thrust for the Airbus Industries A-300 aircraft; the PW-4152, which produces 52,000 pounds of thrust, also for the Airbus Industries A-300 aircraft; and the PW-4158, which produces 58,000 pounds of thrust for the Airbus Industries A-310 aircraft.

Because the engine models within a given engine family are closely related, it is common practice to equip those engine models with inter-operable, interchangeable FADEC units. Such FADEC units include omnibus control schedules that are applicable to all engine models subsumed by the engine family, as well as a comprehensive collection of model-specific control schedules. In addition, the FADEC may include a collection of "EPR modifiers", which are described below. Such an inter-operable FADEC is inter-changeable amongst the engine models and can be readily customized for each model.

The above-mentioned EPR modifier is employed by the FADEC's power or thrust setting control loop. Ideally, the power setting loop would control engine thrust directly. However, the thrust produced by an engine installed on aircraft cannot be easily and accurately measured, and so cannot serve as a feedback parameter for the power setting loop. Accordingly, the engine manufacturer selects a surrogate parameter representative of thrust to serve as the power setting parameter. One parameter known to be useful as a power setting feedback parameter is engine pressure ratio (EPR) which is the ratio of stagnation pressure at the engine exhaust nozzle discharge plane to stagnation pressure at the engine's air intake duct. The relationship between thrust and EPR varies slightly between individual engines, even individual engines of the same model. In order to account for these differences without introducing excessive complexity into the control system power setting schedules, it is common practice to apply a bias to the EPR feedback signal. This EPR bias is referred to as an "EPR modifier". A collection of selectable, predefined EPR modifiers is stored in the memory of a typical inter-operable FADEC. In practice, each individual engine is tested to determine how much its relationship between thrust and EPR deviates from a pre-established norm. The magnitude of the deviation defines the EPR bias that must be applied to the EPR feedback signal. The predefined EPR modifier whose magnitude best approximates the desired EPR bias may then be selected as described below.

A FADEC is customized for a specific engine model and individual engine by an electrically energized engine programming plug (EPP) also referred to as a data plug. An EPP includes an array of pins, each receivable by an externally accessible socket in the FADEC. Several of the pins are electrically grounded to form a common ground terminal. The remaining pins are data input pins that, taken collectively, encode a bit string. The bit string tailors the FADEC to a particular engine model, and to a particular individual engine, by establishing which model-specific control schedules and which EPR modifier the FADEC will obey. The bit represented by each pin depends on whether or not that pin is connected to the ground terminal. Data pins connected to the ground terminal represent the binary digit "0", whereas data pins not connected to the ground terminal represent the binary digit "1". The ground connections are usually effected by jumper wires.

The jumper wire connections are made by a technician who consults an EPP wiring instruction document for the engine model and EPR modifier of interest. The wiring instructions identify which pins to connect to the ground terminal and which to leave ungrounded. When installed in a FADEC, the properly wired EPP constrains the FADEC to obey the model-specific schedules and EPR modifier appropriate for the engine model and individual engine of interest. Once correctly wired, the EPP corresponds to an engine manufacturer's part number. For example, an EPP wired for the PW-4156 engine model would bear a different part number than if it were wired for the PW-4152 engine model. Each EPP also has a numerical EPP class designation, independent of the part number, depending on which of the several EPR modifiers the EPP is wired to select.

Clearly, it is important to ensure that the EPP is correctly wired. Otherwise the data pins may represent an invalid or incorrect bit string. Conventional practice is for the technician to verify the state of each data pin (grounded or ungrounded) by checking for electrical continuity between each pin on the EPP. The technician carries out the checks with a digital ohmmeter that indicates a small resistance (approximately zero Ohms) for grounded data pins and a large resistance, perhaps 1 mega-Ohm, for ungrounded pins. The technician records the measured resistance readings and compares them to correct values on an instruction sheet. This is a painstaking, labor intensive process. In the event that incorrect wiring were detected, the technician would have to correct the wiring error and then repeat the continuity checks, or at least check those pins affected by the wiring error.

What is needed is an apparatus and method for quickly and reliably testing for correct wiring of an engine programming plug.

SUMMARY OF THE INVENTION

It is, therefore, an object of the invention to provide an apparatus and method for quickly and conveniently testing for correct wiring of an engine programming plug.

According to the invention, a tester for validating the wiring configuration of an engine programming data plug includes a computer governed circuit for automatically acquiring data from the plug and a computer commanded display system for reporting the condition of the plug. In one particular embodiment, the tester circuitry includes an array of multiplexers responsive to an incrementable selection signal for concurrently acquiring one data bit from a prescribed data pin in each of several groups of data pins. The computer operates under the authority of an executable computer program that assesses the condition of the programming plug relative to a set of predefined standards.

The principal advantage of the invention is its ability to quickly validate the jumper wire connection in an engine programming plug.

BRIEF DESCRIPTION OF THE DRAWINGS

FIG. 3 is a table showing parallel port signals for the personal computer (PC) of the inventive EPP tester.

FIG. 8 is a listing of the computer code that operates the inventive test system.

FIG. 9 is a tabulation showing the EPP part number and gas turbine engine model associated with various bit patterns produced by an EPP wiring configuration.

FIG. 10 is a table showing the EPP class and EPR modifier associated with various bit patterns produced by an EPP wiring configuration.

BEST MODE FOR CARRYING OUT THE INVENTION

Figure 1B:
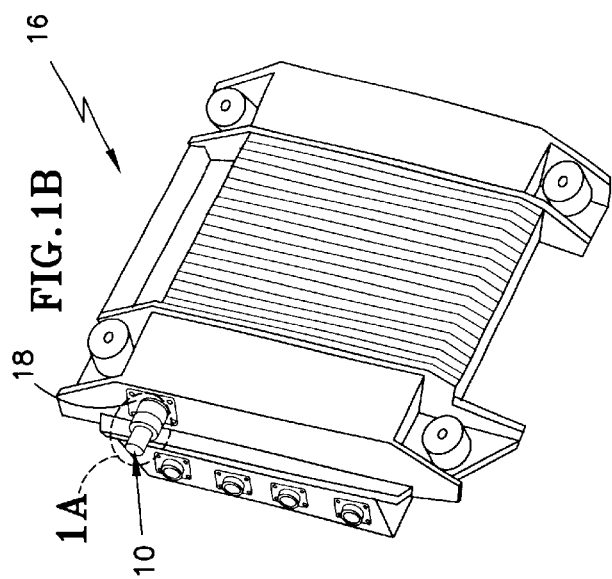
FIGS. 1A and 1B are a schematic illustrations showing an electronic control system for a gas turbine engine and an engine programming plug (EPP) insertable into a receptacle of the control.
Figure 1A:
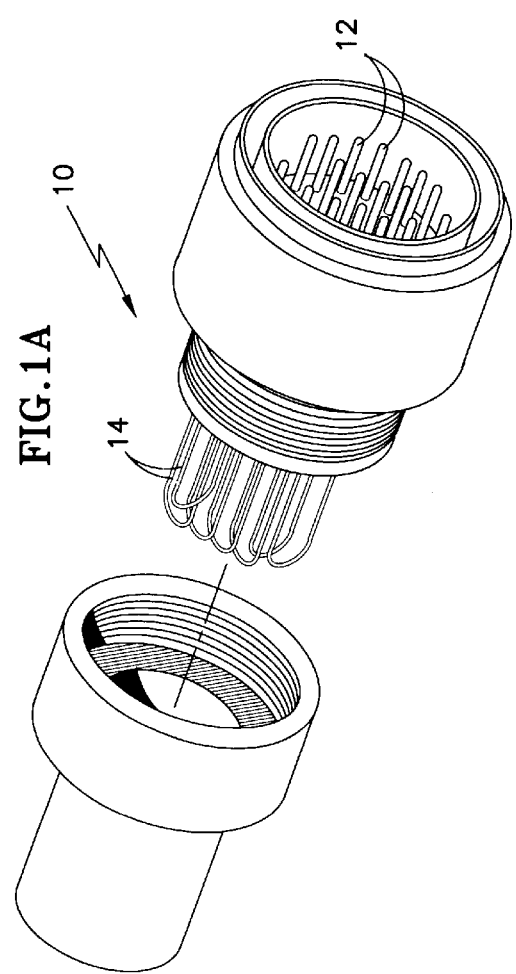

FIG. 1 illustrates an engine programming plug or EPP 10 for the PW-4000 family of gas turbine engines produced by United Technologies Corporation, the assignee of the present application. The illustrated EPP is a model number D38999/26KE26PN military specification plug. An array of pins 12 projects from one end of the plug. The illustrated plug includes 26 such pins that are individually designated by the characters A, B, C, D, E, F, G, J, K, L, M, N, P, R, H, S, b, c, V, Z, X, U, W, T, a and Y. The 26 pins may be conveniently segregated into four groups, channel A data pins (pins A, B, C, D, E, F, G) channel B data pins (J, K, L, M, N, P, R) EPR modifier data pins (H, S, b, c, V, Z) and ground pins (X, U, W, T, a, Y). The ground pins serve as a common ground terminal. Jumper wires 14 connect selected data pins to the ground terminal. In principle, a single pin may serve as the ground terminal. However, multiple ground pins simplify the task of grounding multiple data pins by offering more opportunities for connection of the jumper wires.

FIG. 1 also shows a dual channel, full authority digital electronic control or FADEC 16 for the PW-4000 engine family. The control includes an externally accessible receptacle 18 with 26 sockets, each of which receives one of the 26 EPP pins. With the EPP inserted into the receptacle and electrically energized, the FADEC can read a discrete voltage, relative to ground, from each of the 20 data pins. These discrete voltages, which are simply referred to as "discretes", are typically about 0 volts or 5 volts. The zero volt reading appears at each grounded data pin and represents the binary digit "0". The five volt reading appears at each ungrounded data pin and represents the binary digit "1".

Figure 2:
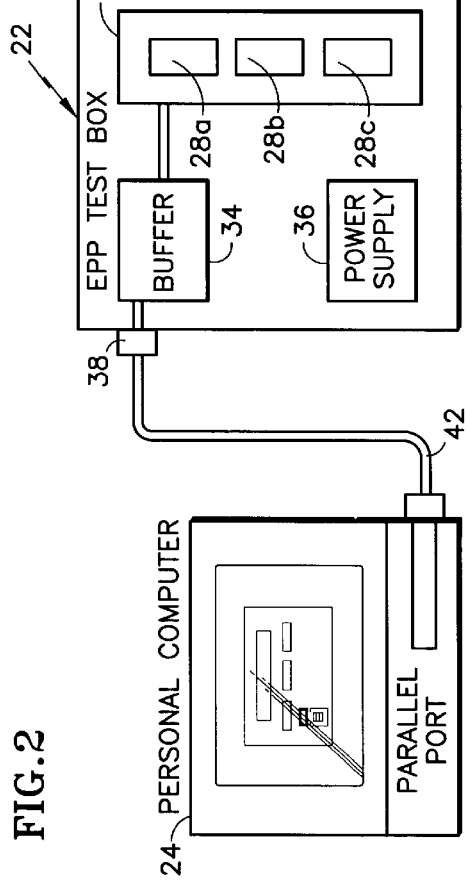
FIG. 2 is a schematic illustration of an EPP test system according to the present invention.

FIG. 2 is a schematic illustration of an engine programming plug test system used to test a plug after the jumper wires have been installed by a technician and prior to installation on a FADEC. The test system comprises a test box 22 and a personal computer or PC 24 with a display system such as a video monitor. The test box includes a mating connector 26 that receives an EPP, a discrete multiplexer array 28 comprising three individual multiplexers 28a, 28b, 28c, a buffer circuit 34, a power supply circuit 36, and a 25 pin D-type parallel port connector 38. A 25 pin parallel cable 42 connects the test box to the parallel port of the personal computer. The test system also uses an executable program referred to as "EPPtest" to operate the multiplexer and buffer circuitry residing in the test box. Components of the system are described in more detail in the following discussion.

The PC Parallel Port

The PC parallel port provides access to a status register, which is "read only" from the perspective of the PC, a control register and a data register. FIG. 3 defines the parallel port signals, arranged by pin number, corresponding to each register. On many parallel ports, the status inputs have pull-up resistors. The parallel port, its registers and the signal definitions of FIG. 3 are conventional.

Figure 4:
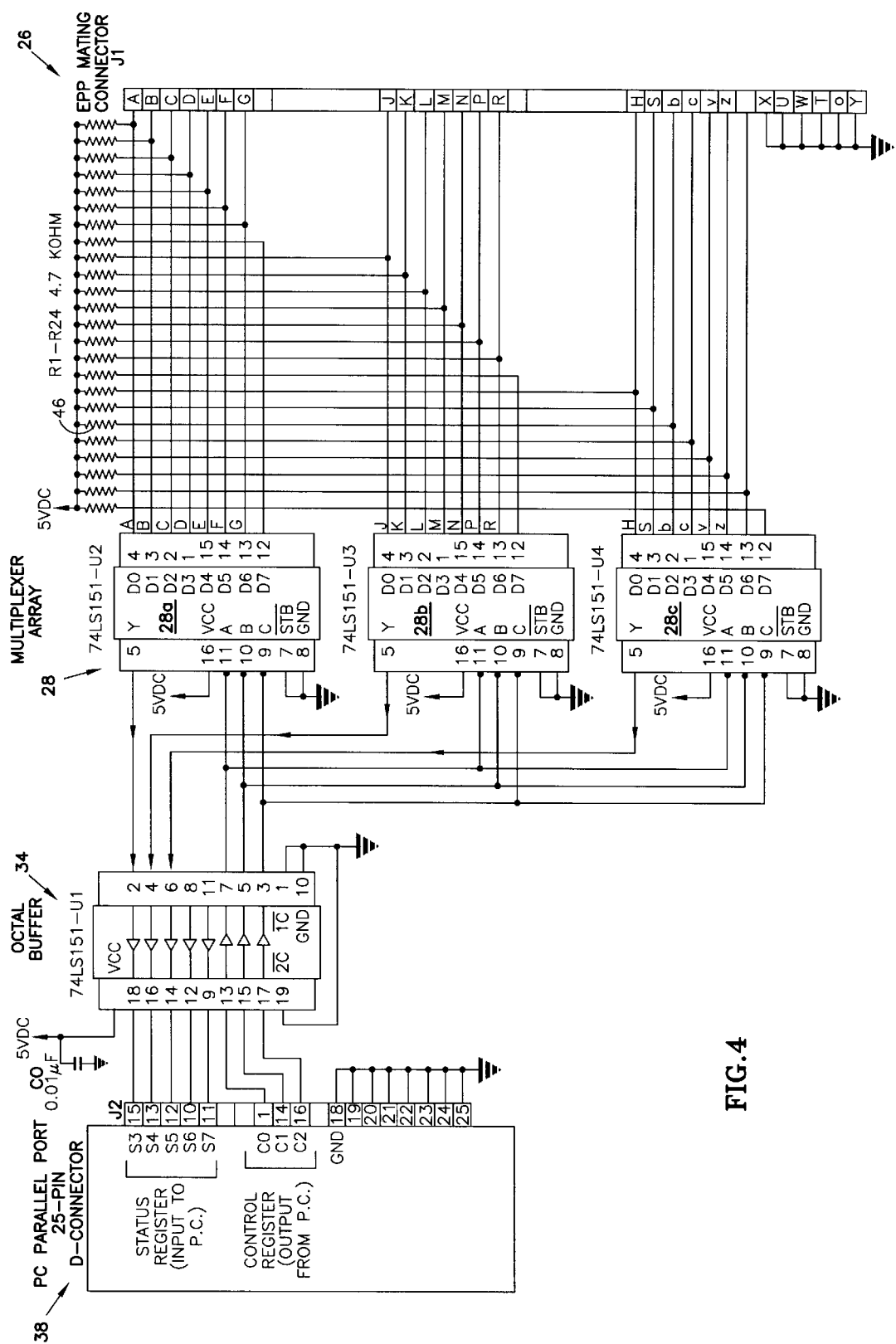
FIG. 4 is a main circuit schematic for the EPP tester of the present invention.

Use of the parallel port and its associated registers in conjunction with the test box 22 is best appreciated by referring to FIG. 4, which shows the main circuit of the EPP tester in greater detail. FIG. 4 also schematically depicts the EPP mating connector 26, the parallel port connector 38 and pertinent portions of the PC parallel port status and control registers. The EPP mating connector 26 includes 26 sockets, each identified in the illustration by alphabetic designators corresponding to the EPP pin identifiers described above (e.g. A, B, C . . . ). When used in conjunction with the test box, the status register holds the logic states of up to five bits designated S3 through S7 (bits S0, S1 and S2 never change state and therefore are disregarded). Although the status register can accept up to 5 bits, the illustrated EPP tester requires that it receive only three bits, S3 through S5. The bits S3 through S5 are output signals from the main circuit multiplexer array 28, and serve as inputs to the test program stored in the PC. The control register holds the logic states of three bits designated C0, C1 and C2. Bits C0 through C2 are outputs from the test program that govern the operation of the multiplexer array. The PC parallel port data register is neither used nor required for the EPP tester and therefore is not depicted in the illustration.

Main Circuit

Continuing to refer to FIG. 4, the principal features of the data acquisition main circuit include the multiplexer array 28, which comprises three individual multiplexer integrated circuits (IC's) 28a, 28b, 28c. The multiplexers 28 are IEEE specification 74LS151 multiplexers. Signals from the seven channel A pins and from the seven channel B pins arrive at terminals D0 through D6 of multiplexers 28a and 28b respectively; signals from the six EPR modifier pins arrive at terminals D0 through D5 of multiplexer 28c. The multiplexer input terminals not receiving signals from the EPP pins are connected to a 5V power supply as shown. The strobe terminal "STB", which acts as an "on/off" switch for each multiplexer, is grounded to continuously enable the multiplexers, i.e. to keep them in the "on" state. The main circuit also includes twenty-four 4.7 Kohm pull-up resistors 46. Four of the resistors provide a predictable high (+5V) state to the unused input terminals of the multiplexers. The remaining twenty resistors provide a pedictible high (+5V) state to the corresponding multiplexer input terminals until those terminals sense a ground state (zero volts) attributable to a grounded EPP data pin. Although the 4.7 Kohm resistors worked satisfactorily in a prototype of the test box, it is recommended that 10 Kohm resistors be used instead. The higher resistance will to reduce current sinking (i.e. current flow) through the multiplexer IC's to about 0.5 milliamps, well within the multiplexer rating of 1.0 milliamp.

The main circuit also includes a buffer 34. The illustrated buffer is an IEEE specification 74LS244 octal buffer. Buffer terminals 2, 4 and 6 each receive an output signal from the "Y" terminal of one of the multiplexers 28. The buffer drives these signals to the parallel port status registers. Buffer terminals 13, 15 and 17 each receive a signal from the control register and drive those signals concurrently to terminals A, B and C of each multiplexer. The concurrently received signals, taken collectively, comprise a three bit selection signal that governs operation of the multiplexer array. Terminals 1, 10 and 19 of the buffer circuit are grounded to enable the octal buffer drivers. A 0.01 uF decoupling capacitor C0 is connected from the VCC terminal (5 volt power supply terminal) of the octal buffer to ground. The capacitor maintains a charge that allows the multiplexer logic gates to switch more quickly without causing voltage spikes in the power supply (discussed below) or ground lines.

Power Supply Circuit

Figure 5:
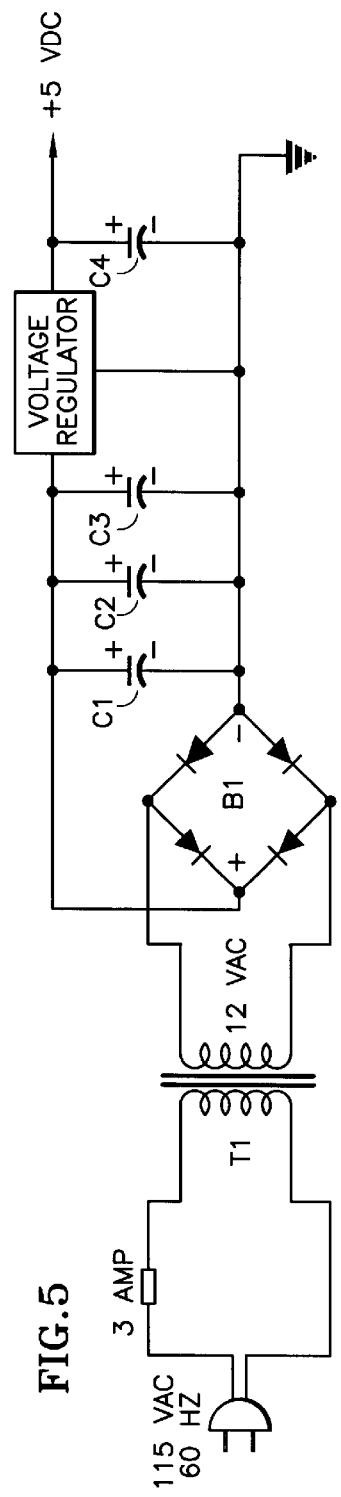
FIG. 5 is power supply circuit schematic for the EPP tester.

FIG. 5 shows the power supply circuit 36 using standard electrical symbols. The circuit comprises a step-down transformer T1, a full wave bridge rectifier B1, three 1000 uF filter capacitors (C1, C2, C3), a 5-volt regulator, and a 0.1 uF filter capacitor C4. The transformer steps down a 115 volt AC primary line voltage to a secondary voltage of 12 volts AC. The rectifier rectifies the secondary AC voltage to DC. The three 1000 uF capacitors minimize the 60 Hz ripple passed through the bridge rectifier. The voltage regulator regulates the output voltage to 5 volts DC regardless of output loading. Finally, the 0.1 uF output capacitor C4 prevents voltage spikes from arriving at the main circuit board IC's, i.e. at the multiplexers & buffers. A three amp fuse protects the circuit from excessive current draw. The power supply feeds the 5 VDC inputs to the main circuit. The power supply ground is connected to the main circuit ground points.

The EPP test box 22 is modular, with the power supply circuit 36 on a separate circuit board from the main circuit. The power supply circuit board is assembled in the base of the test box. The main circuit board is mounted above the power supply by 3-inch stand off bolts. The separate circuit boards allow easy expansion to the main circuit if it is desired to add additional multiplexers to accommodate EPP's having more pins.

The EPP mating connector 26 and the 25 pin D-type parallel port connector 38 are wired to the main circuit board with screw type terminal strips. The screw type terminal strips allow for flexibility with circuit modification if a different EPP test interface is desired.

Wire-wrapping was used for the main circuit board assembly in a prototype of the test box, however it is recommended that etched circuit boards, rather than wire-wrapping, be used for high-volume production.

EPPtest Program and System Operation

An executable computer program referred to as EPPtest operates the test circuitry described above.

To use the system, The technician securely installs an engine programming plug into the EPP mating connector 26 so that signals from the programming plug data pins 12 can arrive at the input terminals of the multiplexers. Signals from the seven channel A pins and from the seven channel B pins arrive at terminals D0 through D6 of multiplexers 28a and 28b respectively; signals from the six EPR modifier pins arrive at terminals D0 through D5 of multiplexer 28c. The technician powers up the PC 24 to fully load Windows® 95 or Windows® 98. An EPPtest Icon appears on the computer monitor screen. The technician launches the EPPtest.exe executable program by double-clicking on the EPPtest Icon. In response, the video monitor displays the EPP Test Program window of FIG. 6. The window contains one command button labeled "Test EPP" and four main display fields, "EPP Part Number", "Engine Rating" (i.e. engine model designation) "EPP Class/Delta EPR" and "Input Bytes". The "Input Bytes" display field comprises three sections used to display the states of FADEC channel A and B discretes and the EPR modifier discretes. The technician executes the program by left-clicking on the "Test EPP" command button.

The program then loops or increments through all eight control port bit patterns representable by three bits, and writes those bits, C0, C1 and C2 to the control register. The buffer 34 conveys each bit pattern to each of the three multiplexers to select one of the eight inputs at multiplexer terminals D0 through D7. For example, control bit pattern 000 is a selection signal that causes multiplexer input bit D0 (the states of pins A, J and H) to be selected from each of the three multiplexers; control bit pattern 001 causes multiplexer input bit D1 (the states of pins B, K and S) to be selected from each of the three multiplexers, and so forth. The selected inputs appear at the output "Y" terminal of each multiplexer. For each control bit pattern, the serial output from each multiplexer is buffered, i.e. filtered for voltage fluctuations that could damage or disable the parallel port, and written to status register bit locations S3–S5. After the subroutine finishes incrementing through all eight bit patterns representable by C0, C1 and C2, the main memory contains three input bytes referred to as byte(0), byte(1) and byte(2). Byte(0) contains the states of the channel A EPP pins, A, B, C, D, E, F, and G as well as one "unused" bit. Byte(1) contains the states of the channel B EPP pins J, K, L, M, N, P, and R along with one "unused" bit. Byte(2) contains the states of the EPR modifier pins H, S, b, c, V, and Z along with two "unused" bits. These three bytes are displayed, in hexadecimal, in the "Input Bytes" sections of the display on the monitor.

Figure 7:
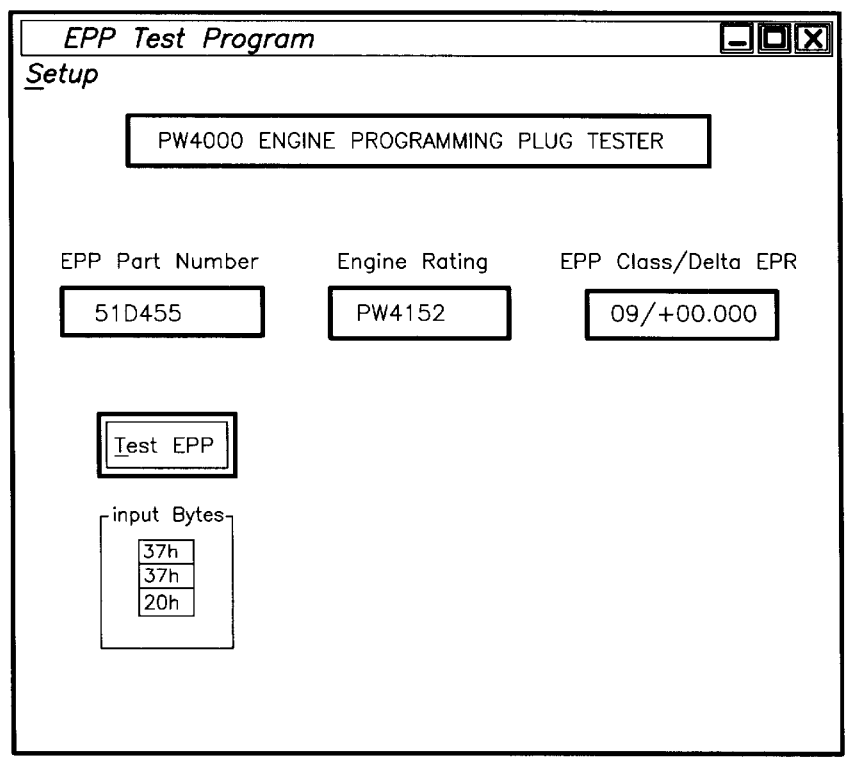
FIG. 7 is an illustration similar to FIG. 6, but showing valid data in the display fields.

The program then tests the Input Bytes using a set of standards to assess the condition or validity of the programming plug wiring configuration. In particular, the program uses "if-then" type statements to determine the validity of the data, the EPP Part Number, the Engine Rating (i.e. engine model) and the EPR Modifier Class/Delta EPR value. Alternatively, the program could use look-up tables in lieu of the "if-then" criteria. The program commands the video monitor to display the results in the appropriate display fields. If the system detects an invalid EPP configuration, it sounds an alarm and displays the message "Invalid EPP" in the EPP Part Number field. FIG. 7 shows the EPPTest Program Window with valid data in each display field. The "h" suffix appended to each input byte reminds the user that each byte is displayed in hexadecimal format.

Visual Basic Code

Microsoft Visual Basic version 6.0 was used to develop the code for the EPPTest.exe executable program. A listing of the code is provided in FIG. 8. The program causes the main test circuit to survey all 20 input bits represented by the EPP data pins at the EPP connector 26. As described above, three bits, one from each multiplexer, are read at a time. The program then assembles the bits into three bytes of eight bits each and displays these input bytes in the "Input Bytes" display fields. Next the program checks the validity of the EPP, the Part Number and the Engine Rating (engine model) and displays the results in the EPP Part Number and Engine Rating fields. Finally, the program determines the EPP Class and EPR Modifier values and displays them in the EPP Class/Delta EPR field on the EPP Test Program window.

Figure 6:
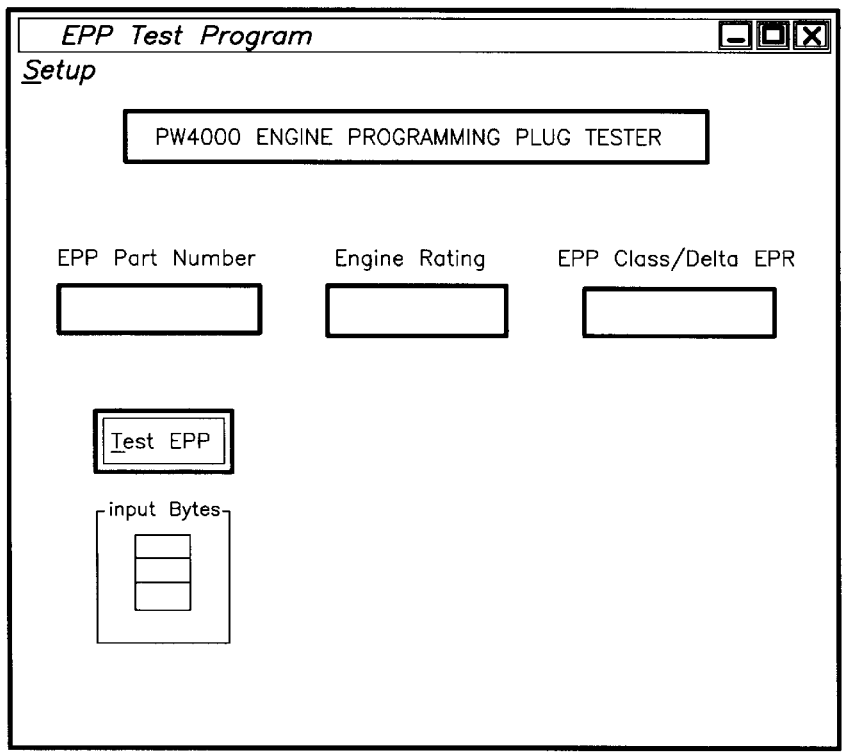
FIG. 6 is an illustration of a blank display window generated by the inventive test system on a video monitor.

The Visual Basic code includes five primary subroutines:

1) cmdReadBytes_Click
2) GetBytesFromDataIn
3) DisplayResults
4) DisplayPartNumber
5) DisplayEPPClass The cmdReadBytes_Click subroutine is initiated when the user clicks the left mouse button on the "Test EPP" command button depicted in FIGS. 6 and 7. The subroutine writes to the Control register's base address, which is the LPT port (i.e. parallel port) base address+2, to select a bit number to read from the multiplexers. The routine loops through bit numbers 0–7 to select all inputs read by the three multiplexer IC's. The states of the bits sensed at the status port are then stored in the status register.

The program then branches to the GetBytesFromDataIn subroutine, which assembles bits 3–5 of the Status register, at LPT port base address+1. Three eight-bit data input bytes are then assembled from the bits such that byte(0) holds the seven channel A data bits, byte(1) holds the seven channel B data bits and byte(2) holds the six EPR modifier bits.

Next, the program branches to the DisplayResults subroutine to display the three input byte values, and the "h" indicating hexadecimal, in the three "Input Byte" display fields on the display window.

The program then branches to the DisplayPartNumber routine. This subroutine contains 'If-then' and 'Select Case' statements to determine the validity of the EPP jumper configuration, the EPP Part Number, and the Engine Rating (engine model). The table of FIG. 9 summarizes the EPP Part Number and engine rating (engine model) associated with various bit patterns (EPP wiring configurations). Only sixty-three of the bit patterns representable by the seven channel A and seven channel B data pins are shown in the table since bit G of byte(0) and bit R of byte(1) are parity bits. Of the remaining sixty-four possible bit patterns representable by each byte, the "all-zero" pattern is expressly accounted for in the EPPtest program, leaving only the sixty three patterns enumerated in the table. Moreover, and as seen in the table, certain bit patterns are designated as invalid because they correspond to EPP part numbers not presently valid but pre-allocated for future use.

The DisplayPartNumber subroutine tests for an invalid part number (wiring configuration) by checking if byte(0), the uppermost byte shown on the display, is not equal to byte(1), the center byte shown on the display. Such an inequality would indicate that channels A and B are receiving disparate information. Should such condition exist, the program displays the warning "Invalid P/N" in the EPP Part Number display field and sounds an audible alarm. Next, the DisplayPartNumber subroutine checks byte(0) to determine if its value is zero (i.e. "0h") If so, then an EPP is not installed in the mating connector 26 (or is not installed securely and correctly) and so the program writes "Plug Not Installed" to the EPP Part Number display field and sounds an audible alarm. If a plug is installed and if the channel A and channel B reading agree, the Select Case statements are then used to test for the various part numbers and engine ratings. The EPP part number and engine rating are then displayed in the appropriate fields on the display window.

Finally, the program branches to the DisplayEPPClass subroutine to check for a valid EPR Modifier class and Delta EPR values. The table of FIG. 10 shows the pin configurations for the sixteen available EPP classes and corresponding EPR modifiers. If an invalid class is detected ("0h" for byte(2)) the warning "Invalid Class" is displayed in the EPP Class display field. The appropriate EPP Class and EPR modifier values are displayed if the byte(2) data is valid. FIG. 10 accounts for only sixteen bit patterns because two of the bits are parity check bits, leaving only four bits to represent the EPR modifier class.

As an example, if the channel A data pins G, F, E, D, C, B, A read 0, 1, 1, 0, 1, 1, 1, respectively ("37h"); the channel B data pins R, P, N, M, L, K, J also read 0, 1, 1, 0, 1, 1, 1, respectively ("37h") and the EPR modifier pins Z, V, c, b, S, H read 1, 0, 0, 0, 0, 0 respectively ("20h") then the EPP part number is 51D455, the Engine Rating (engine model) is the PW4152, the EPP class is 09 and the EPR modifier is 0.0, as seen from the tables of FIGS. 9 and 10. The corresponding display is as shown in FIG. 7.

With the invention now having been described, certain design features, options and alternatives can be better appreciated.

The PC parallel port, rather than the serial port was chosen as the interface to the EPP box because it commonly exist in most PCs. Use of the serial port would have require more costly test box circuitry and complicated programming because additional circuitry would have been required to convert the twenty EPP discrete inputs to a serial data stream. Decoding of that serial data would also have required more complicated programming. A custom PC expansion card was not chosen because of the added cost of the card and the need for an empty expansion slot in the personal computer. In addition, the presence of unused input terminals 8 and 11 on the buffer 34 means that two more multiplexer ICs could be included so that the tester could accommodate an EPP having up to 40 data pins.

The "EPPTest" application program, as written, will not work on Windows® NT due to Microsoft® protection of the PC port access. Additional programming would be required to allow the EPP tester system to be run on a computer running the Windows® NT platform.

The program could also be enhanced to require user input for name, date, engine model, and engine serial number. This information, along with the EPP test results could be used to create a text file for documentation of the EPP assembly and successful checkout. The program could also be set up to link to a separate text file for the EPP part number, engine rating, and EPP Class look-up data. This would allow the user to easily edit the data using any text editor. The "EPPTest" program could be expanded to display each pin letter of the EPP connector that is jumpered to a ground pin. This would allow the technician to easily troubleshoot a mis-wired engine programming plug.

Although the standards for assessing the condition or validity of an EPP wiring configuration are included as part of the EPPtest program, they could be made globally accessible from the engine manufacturer's site on a computer network such as the "World Wide Web". For example, look-up tables analogous to those of FIGS. 9 and 10 could be made accessible from the site. To use data from the site, the user would merely download the information from the site and provide it to the PC running the EPPtest application program. EPPtest would read the valid EPP configuration data from the downloaded information when performing the EPP checkout. Such accessibility would be advantageous because the user would have immediate access to additions or corrections.

Although this invention has been shown and described with reference to a detailed embodiment thereof, it will be understood by those skilled in the art that various changes in form and detail may be made without departing from the invention as set forth in the accompanying claims.

I claim:

1. A tester for examining a data plug, comprising:
   a circuit including a multiplexer array responsive to a selection signal for concurrently acquiring data bits from said data plug;
   a display system for reporting the condition of said data plug; and
   a computer communicating with said circuit and said display system for governing said circuit and for commanding said display system.

2. The tester of claim 1 wherein said computer includes an executable program for governing said circuit and for commanding said display system.

3. The tester of claim 1 wherein said selection signal is incrementable over a range of values.

4. The tester of claim 1 wherein said display system includes a video monitor and an audible alarm.

5. The tester of claim 1 comprising standards for assessing the condition of said data plug.

6. The tester of claim 5 wherein said standards are represented by "if-then" tests.

7. The tester of claim 5 wherein said standards are represented as data tables.

8. The tester of claim 5 wherein said standards are available from a site on a computer network.

9. The tester of claim 1 wherein the reported condition of the data plug includes at least one of a data plug part number, an engine rating, an EPR modifier class and a delta EPR value.

10. A tester for a turbine engine programming plug, said plug having two or more groups of data pins, each of said groups including two or more pins, comprising:
    an array of multiplexers for concurrently acquiring one data bit from a prescribed data pin in each of said groups of data pins;
    a computer operating under the authority of an executable computer program for receiving said data bits and for producing an incrementable selection signal for successively prescribing an individual data pin in each of said groups of pins from which said one data bit is to be acquired;
    a standard for assessing the condition of said programming plug based on said data bits;
    a display system, responsive to said computer program, for reporting the condition of said programming plug.

11. The tester of claim 10 including a programming plug connector for receiving said data pins, said connector being in communication with said multiplexers.

12. The tester of claim 10 comprising a buffer circuit interposed between said computer and said multiplexer array.

* * * * *